United States Patent
Brown

(10) Patent No.: US 8,967,873 B2
(45) Date of Patent: Mar. 3, 2015

(54) FLEXIBLE BEARING CAGE

(71) Applicant: Schaeffler Technologies AG & Co. KG, Herzogenaurach (DE)

(72) Inventor: Mark Brown, Lakewood, OH (US)

(73) Assignee: Schaeffler Technologies GmbH & Co KG, Hezogenaurach (DE)

( * ) Notice: Subject to any disclaimer, the term of this patent is extended or adjusted under 35 U.S.C. 154(b) by 4 days.

(21) Appl. No.: 13/854,421

(22) Filed: Apr. 1, 2013

(65) Prior Publication Data

US 2013/0266250 A1 Oct. 10, 2013

Related U.S. Application Data

(60) Provisional application No. 61/622,053, filed on Apr. 10, 2012.

(51) Int. Cl.
 *F16C 19/00* (2006.01)
 *F16C 33/38* (2006.01)
 *F16C 33/66* (2006.01)

(52) U.S. Cl.
 CPC ......... *F16C 33/3887* (2013.01); *F16C 33/6681* (2013.01); *F16C 33/3806* (2013.01); *F16C 33/385* (2013.01); *F16C 2300/22* (2013.01)
 USPC .......................................... 384/470; 384/523

(58) Field of Classification Search
 USPC ......... 384/470, 523, 526, 527, 531, 534, 572, 384/576
 See application file for complete search history.

(56) References Cited

U.S. PATENT DOCUMENTS

| | | | | |
|---|---|---|---|---|
| 3,597,031 | A * | 8/1971 | Bill | 384/470 |
| 4,004,840 | A | 1/1977 | Johnston et al. | |
| 4,915,515 | A * | 4/1990 | Rohrer et al. | 384/465 |
| 5,154,401 | A | 10/1992 | Schramm et al. | |
| 5,575,569 | A * | 11/1996 | Shinohara | 384/470 |
| 6,247,847 | B1 | 6/2001 | Lob | |
| 6,402,386 | B1 * | 6/2002 | Daikuhara | 384/470 |
| 6,447,169 | B2 | 9/2002 | Chambert | |
| 6,843,604 | B2 * | 1/2005 | Hiramatsu | 384/523 |
| 7,114,852 | B2 * | 10/2006 | Compassi | 384/470 |
| 8,011,833 | B2 * | 9/2011 | Hirata et al. | 384/527 |
| 8,016,490 | B2 * | 9/2011 | Hosoya et al. | 384/531 |
| 8,292,512 | B2 * | 10/2012 | Tanaka et al. | 384/531 |
| 2006/0115193 | A1 | 6/2006 | Begin | |
| 2010/0290728 | A1 * | 11/2010 | Solfrank et al. | 384/470 |

FOREIGN PATENT DOCUMENTS

| | | |
|---|---|---|
| JP | 2007-263280 A | 10/2007 |
| WO | 2010112432 A1 | 10/2010 |
| WO | 2011141122 A2 | 11/2011 |

OTHER PUBLICATIONS

International Search Report for PCT/US2013/034809, mailed Jul. 8, 2013 by Korean Intellectual Property Office.
FAG Roller Bearings Technical Information, 'FAG Rolling Bearing Cages', Aug. 2000, pp. 1-19.

* cited by examiner

*Primary Examiner* — James Pilkington
(74) *Attorney, Agent, or Firm* — Antun M. Peakovic

(57) ABSTRACT

A rolling element guide for a bearing assembly formed with cantilevered arms, the arms flexibly adjusting to contact with a guide surface of an inner or outer ring of a bearing. Lubrication channels in a surface of the cage are also disclosed.

14 Claims, 3 Drawing Sheets

FLEXIBLE BEARING CAGE

TECHNICAL FIELD

Example aspects described herein relate to bearing assemblies, particularly of bearing rolling element guides or cages.

BACKGROUND

Bearing assemblies are typically circular in shape, and generally comprise rolling elements sandwiched between raceways in bearing rings. Rolling elements take many forms, including spherical balls, rollers or various other configurations, such as cone-shaped tapered rollers or barrel-shaped spherical rollers. Bearing rolling element guides, or cages, retain rolling elements within a bearing assembly, while typically allowing for free rotation of the rolling elements within the cages, and rotation of the cages within the bearing assembly. Cages can be used to separate rolling elements from each other, generally at equal intervals, and hold rolling elements in alignment with respect to the bearing rings. Depending on the structure of the bearing, or the bearing design, cages may be linear or circular and made from a variety of materials, including, but, not limited to brass, steel, and various types of plastic.

Broadly, there are two main types of bearing cages; "crown" or "snap" cages; and "ribbon" or "riveted" cages. The "snap" type has an annular side member and axial partitions projecting from said member. These partitions are typically parallel to each other and have open rolling element pockets, allowing said rolling elements to seat or "snap" into position within these open pockets. The "riveted" type is comprised of two pieces or halves, each half with an open pocket to accommodate a rolling element. The halves are assembled on opposite sides of the rolling element, the pockets surrounding the rolling elements, and contact at land surfaces at intervals between rolling elements, then are joined together at the mating surface using various types or fastening elements, such as rivets.

Cages are guided by one of the available surfaces between the inner and outer rings. Cages may be guided by the inner land or surface, wherein, the cage's bore slides, or is guided by, the outer diameter surface of the inner ring. They may also be guided by the outer land, wherein, the cage's bore slides, or is guided by, the inner diameter surface of the outer ring. Finally, cage's may touch neither ring, and be guided by the rolling elements themselves.

Some example bearing cages are shown in U.S. Pat. Nos. 6,247,847, 5,154,401 and 4,004,840.

Different types and sizes of bearings require specifically designed bearing cages, taking into account bearing assembly size, operating conditions, and rolling element size, among other factors. It is understood that a particular design of bearing may incorporate a type of cage, but, may require variations in the cage to accommodate the specific bearing, for example choice of rolling element or material used. For example, high speed bearings, particularly with accompanying high operating temperatures or working environments, generally have cages made of steel. The steel cage is rigid and hence does not conform easily with the guiding race land or surface. Surface pressures, in turn, are high due to the limited contact area caused by the lack of flexibility or compliance with the land or guiding surface. This causes potential for accelerated wear and subsequent particle generation as the steel of the cage rubs on the steel of the bearing ring. Accelerated wear may cause premature degeneration of the bearing, as a whole, and particulate matter may cause noise during bearing operation. A solution to address bearing cage wear, particularly in high speed applications, is needed.

SUMMARY OF THE INVENTION

A new design for a bearing cage is disclosed. In one example embodiment of the invention, the cage comprises lubrication channels and compliant or flexible features at intervals around the circumference of the cage, the flexible features conforming to a bearing land or guiding surface.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner. Radially inward directions are from an outer radial surface of the cage, toward the central axis or radial center of the cage. Conversely, a radial outward direction indicates the direction from the central axis or radial center of the cage toward the outer surface. "Cage" and "rolling element guides" are used interchangeably.

Figure 1:
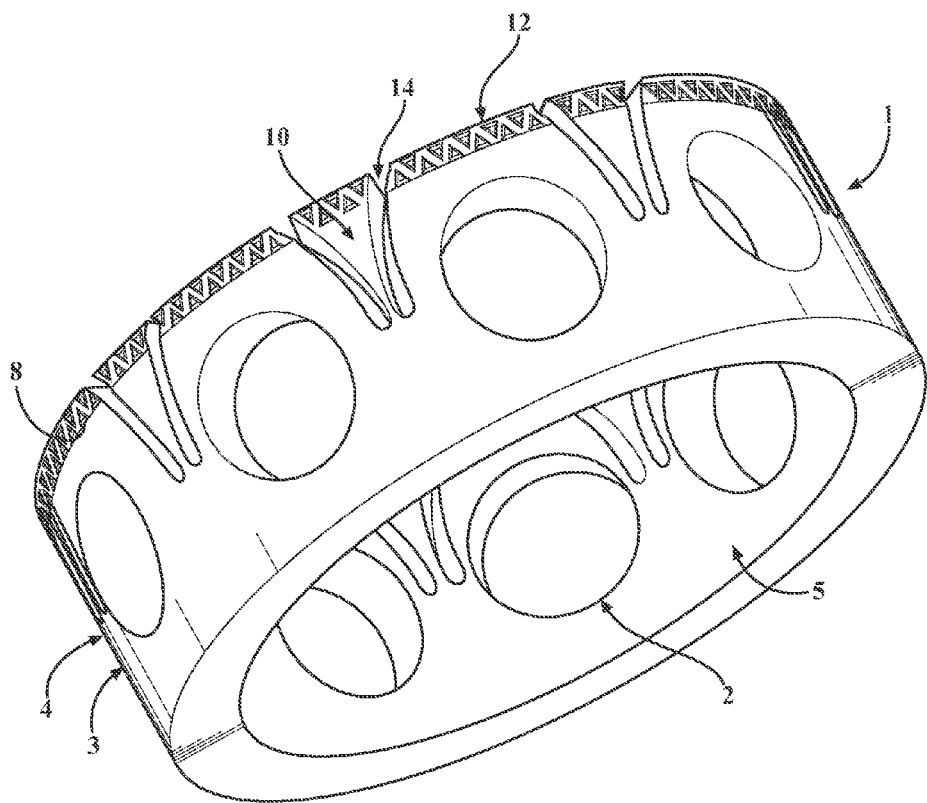
FIG. 1 is a perspective view of a cage according to one example embodiment herein described.

FIG. 1 is a perspective view of cage 1 according to one example embodiment of the invention. In this embodiment a machined steel ball cage with outer cage guidance is shown, but, any cage design, including but not limited to, different rolling element pockets, alternative guide surfaces, or different standard cage designs is contemplated in the invention. In this perspective view, cage 1 comprises pockets 2, cage body 3, radially outer circumferential surface 4, radially inner circumferential surface 5, compliant arms 10, cutouts 14, and lubrication channels or grooves 12. In this example embodiment, compliant arms 10 are machined or cut into cage body 3, forming triangular projections, remaining attached at the apex of the triangle to cage body 3. As compliant arms 10 are machined or cut into an already formed cage body 3, arms 10 will have substantially the same material thickness as the remainder of body 3. Similarly, grooves 12 are cut or machined into a surface of body 3, forming raised surfaces 8, the surfaces 8 raised relative to the grooves 12. In this example embodiment, cage body 3 is a cylindrical body, having a first axial end opposite compliant arm 10 and a second axial end adjacent compliant arm 10; a first portion of the body extending from the first axial end of the body to the apex of arm 10; and a second portion of the body extending from the second axial end to the apex of the arm. As the example embodiment shown is an outer guided cage, guided on an inner surface of an outer ring of an associated bearing assembly (not shown), cage body 3 includes raised surface 8 projecting radially outwardly from outer surface 4 of cage 1. In the example embodiment, the radially outer surface of raised surface 8 is machined or formed to include lubrication channels 12, shown as, but not limited to, knurls or triangular patterned channels. As it is contemplated that grooves 12 are pre-formed in cage body 3, rather than machined or cut, raised surface 8 may also be formed relative to grooves 12. Lubrication channels 12 trap lubrication within the channels, prevent lubrication from being pushed away during operation and guide lubrication toward rolling elements (not shown) retained in pockets 2, improving operating performance and heat dissipation. Although shown as extending through the entire circumference of cage 1, channels 12 may be formed instead at intervals.

Compliant arms 10 can be integrally formed, machined or manufactured by any number of available means. As cantilevered arms, arms 10 have increased flexibility relative to a uniform cage body, such that arms 10 can flex radially inwardly or outwardly to conform to contact with a guiding surface of a bearing outer ring (not shown) during operation. Similarly, where a cage is an inner guided cage, raised surface 8 projects radially inward from inner surface 4 of cage body 3, with corresponding lubrication channels 12 directed radially inward.

Figure 2:
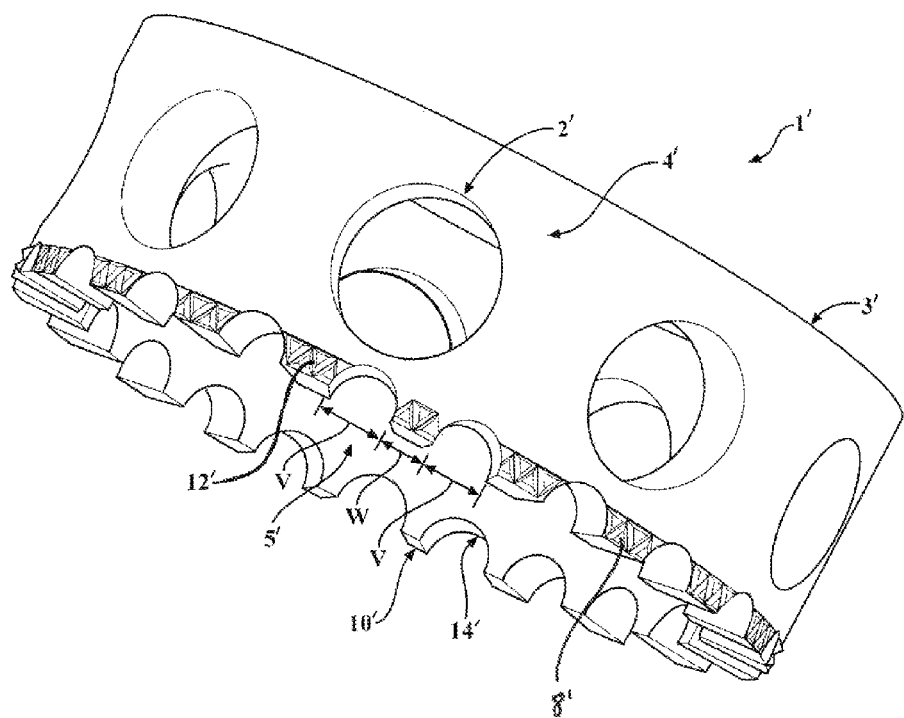
FIG. 2 is a perspective view of a cage according to a second embodiment herein described.

FIG. 2 is a perspective view of cage 1' according to another example embodiment of the invention. In this embodiment, cage 1' comprises pockets 2', cage body 3', outer surface 4', inner surface 5', compliant arms 10', and lubrication channels 12'. In this example embodiment, compliant arms 10' are formed by machining or forming cutouts 14' extending from outer surface 4' to inner surface 5'. Cutouts 14' are shown as rounded, reducing stress at the base of arms 10', but also reducing flexure of said arms 10'. The relative width W of compliant arms 10' and width V of cutouts 14' will depend on the particular cage size, thickness and design. Although arms 10' and cutouts 14' are shown at regular intervals around the entire circumference of cage 1', fewer or more irregularly spaced arms 10' are also contemplated by this invention. Similar to the embodiment of FIG. 1, arms 10' are cantilevered arms, flexing radially inwardly or outwardly to conform to contact with a guiding surface of a bearing outer ring (not shown) during operation. Channels 12' are similar to that described in FIG. 1, and, as in FIG. 1, may also be straight channels rather than knurls. In a situation in which cage 1' is an inner guided cage, raised surface 8' projects radially inward from inner surface 4' of cage body 3', with corresponding lubrication channels 12' directed radially inward.

Figure 3:
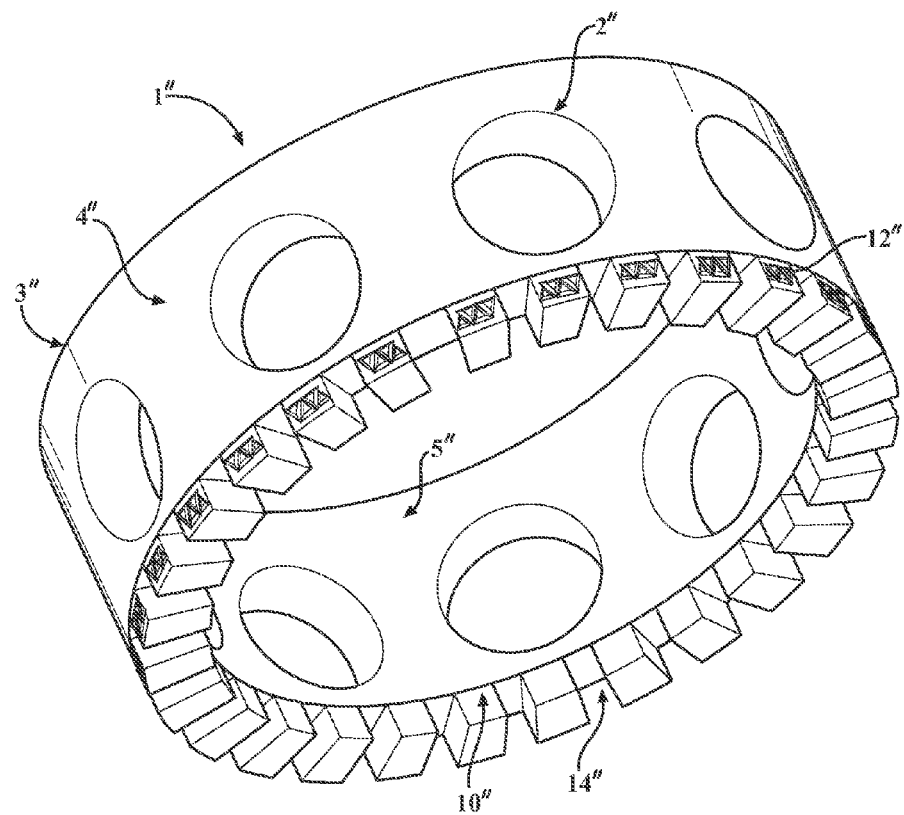
FIG. 3 is a perspective view of a cage according to a further embodiment herein described.

FIG. 3 is a perspective view of cage 1" according to a further example embodiment of the invention. In this embodiment, cage 1" comprises pockets 2", cage body 3", outer surface 4", inner surface 5", compliant arms 10", cutouts 14" and lubrication channels 12". In this embodiment, cutouts 14" are straight channels, which can increase stress at the base corners of arms 10", but, also increasing flexure of said arms. Otherwise the function of arms 10", cutouts 14" and channels 12" are the same as previously described for arms 10, 10', and channels 12, 12' in FIGS. 1 and 2, respectively.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Cage
2 Pockets
3 Cage Body
4 Cage Outer Surface
5 Cage Inner Surface
10 Compliant Arms
12 Lubrication Channels
14 Cutouts
1' Cage
2' Pockets
3' Cage Body
4' Cage Outer Surface
5' Cage Inner Surface
10' Compliant Arms
12' Lubrication Channels
14' Cutouts
1" Cage
2" Pockets
3" Cage Body
4" Cage Outer Surface
5" Cage Inner Surface
10" Compliant Arms
12" Lubrication Channels
14" Cutouts

What I claim is:

1. A rolling element guide for a bearing assembly comprising:
    a cylindrical body having:
        an inner and an outer radial surface;
        a first and a second axial end;
        a first and a second axial portion;
        at least two cutout channels extending from the inner radial surface to the outer radial surface of said cage;
        a compliant arm formed by the at least two cutout channels;
        the first axial portion of the body extends from the first axial end of the body to the arm;
        the second axial portion of the body extends from the first axial portion to the second axial end;
        at least two grooves formed on the outer or inner radial surface of the body coincident with the second axial end and separated by a raised surface, wherein:
        the first axial portion, the second axial portion and the arm have substantially the same material thickness.

2. The guide of claim 1, wherein said guide is made of a material selected from the group consisting of plastic, steel or bronze.

3. The guide of claim 1, wherein, said at least two cutouts are angled linear channels.

4. The guide of claim 1, wherein said at least two cutouts are of a semi-circular form.

5. The guide of claim 1, wherein the raised surface is a knurled surface.

6. The guide of claim 1, wherein, the compliant arm is of a triangular form.

7. The guide of claim 1, wherein, the compliant arm is of a rectangular form.

8. A bearing assembly comprising:
- an outer ring;
- an inner ring;
- a plurality of rolling elements; and
- a cage including:
- a cylindrical body having:
    - an inner and an outer radial surface;
    - a first and a second axial end;
    - a first and a second axial portion;
    - at least two cutout channels extending from the inner radial surface to the outer radial surface of said cage;
    - a compliant arm formed by the at least two cutout channels;
    - the first axial portion of the body extends from the first axial end of the body to the arm;
    - the second axial portion of the body extends from the first axial portion to the second axial end;
    - at least two grooves formed on the outer or inner radial surface of the body coincident with the second axial end and separated by a raised surface, wherein:
- the plurality of rolling elements are retained in pockets and disposed between said inner and outer rings; and
- the first axial portion, the second axial portion and the arm have substantially the same material thickness.

9. The assembly of claim 1, wherein said cage is made of a material selected from the group consisting of plastic, steel or bronze.

10. The assembly of claim 1, wherein, said at least two cutouts of said cage are angled linear channels.

11. The assembly of claim 1, wherein, said at least two cutouts of said cage are of a semi-circular form.

12. The assembly of claim 1, wherein, the raised surface of said cage is a knurled surface.

13. The assembly of claim 1, wherein, the compliant arm of said cage is of a triangular form.

14. The assembly of claim 1, wherein, the compliant arm of said cage is of a rectangular form.

* * * * *